UNITED STATES PATENT OFFICE.

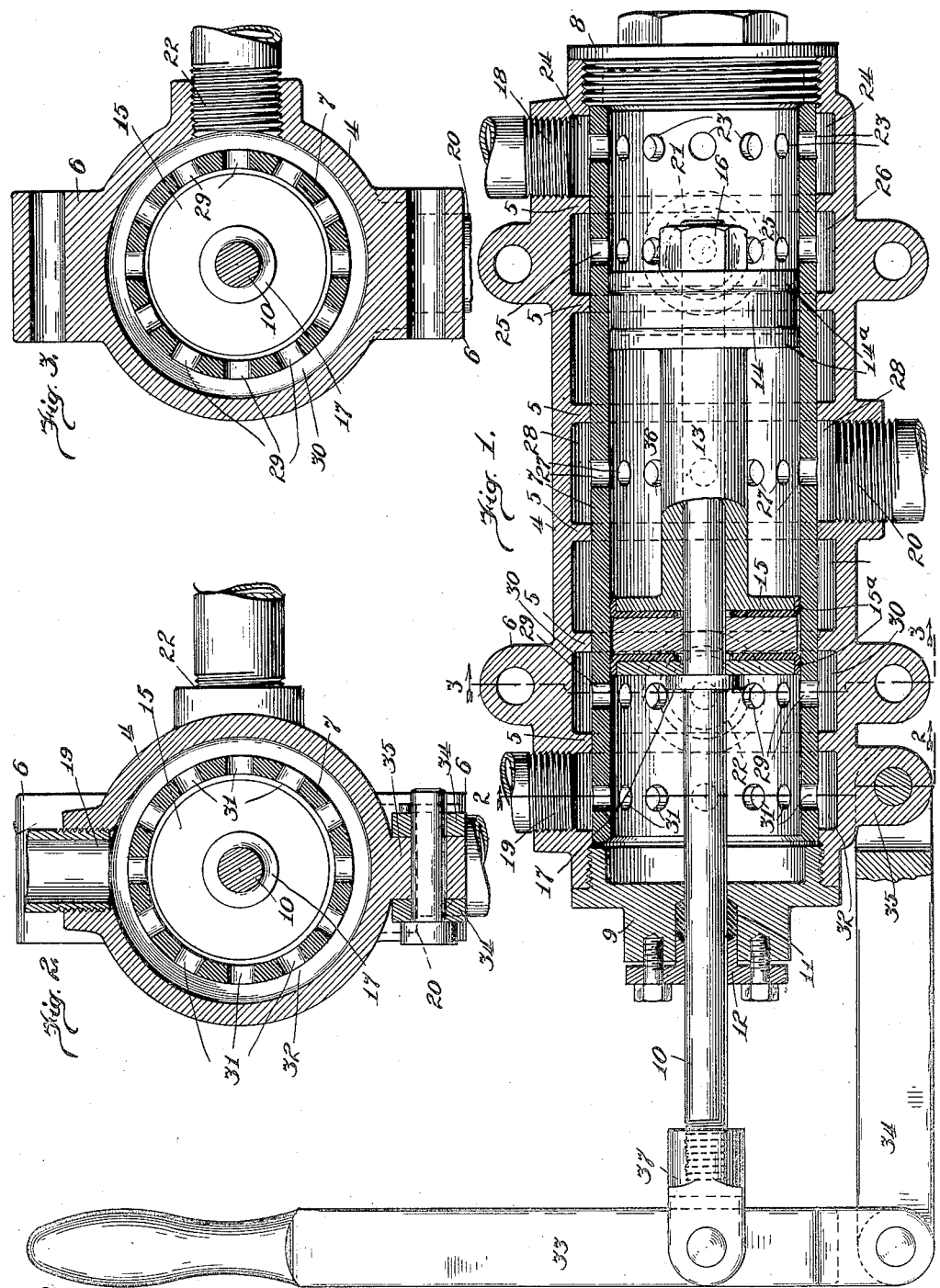

HENRY W. JACOBS, OF TOPEKA, KANSAS.

VALVE.

1,057,554.

Specification of Letters Patent.  Patented Apr. 1, 1913.

Application filed October 11, 1911. Serial No. 654,075.

*To all whom it may concern:*

Be it known that I, HENRY W. JACOBS, a citizen of the United States, and resident of Topeka, in the county of Shawnee and State of Kansas, have invented certain new and useful Improvements in Valves, of which the following is a description, reference being had to the accompanying drawing, which forms a part of my specification.

My invention relates more particularly to what may be termed a four-way valve whereby admission and exhaust to and from one or more cylinders, as on hydraulic or pneumatic presses, riveters, clamps, and the like, either repeatedly or alternately, may be had.

The object of my invention is to provide a four-way valve that will not only be simple and economical in construction, but one that will allow both exhausts to be open at the same time and thereby insure no movement of the piston or pistons, other than that desired; the advantages of my invention will be more apparent from the following detailed description.

In the drawings:—Figure 1 is a longitudinal sectional view, with a portion of the valve piston at the right hand end of the figure shown in full lines. Fig. 2 is a transverse sectional view taken on the line 2—2 of Fig. 1, looking in the direction of the arrows. Fig. 3 is a similar view taken on the line 3—3 of Fig. 1, looking in the direction of the arrows.

In the preferred construction shown in the drawings, the valve comprises the elongated shell or body 4, preferably cylindrical in form, whose interior is provided with a series of circumferential ribs as at 5 arranged at predetermined distances apart about the inner periphery of casing 4, while the outer periphery is provided with suitable lugs 6 whereby the valve may be secured in place. Concentric with the shell or casing 4, and extending longitudinally therethrough, is an inner cylindrical casing 7, whose outside diameter is such as to have the inner shell 7 fit snugly within the circumferential ribs 5, so as to divide the interior of the body or shell 4, into a number of circumferential compartments or passages, as clearly shown in Fig. 1.

The inner shell 7 can be maintained in its relative position within the outer shell by any suitable means. Externally threaded screw caps 8 and 9, close the ends of outer casing 4, the caps being preferably screwed into the threaded ends of casing 4, a sufficient distance to bring them into close proximity to the inner shell 7, thereby preventing any appreciable accidental longitudinal movement of the inner shell and also preventing the escape of the medium or fluid through the ends of the casing. Cap 9 is provided with a central opening so as to permit of the passage of valve stem 10 therethrough; the opening being, of course, provided with a suitable gland as at 11, which is held in place by the member 12 so as to form a fluid tight connection.

Slidably mounted within the inner shell 7, is a double piston valve 13, provided with suitable fluid tight pistons 14 and 15, which may be packed in any suitable manner, preferably by the leather cup disks as at $14^a$ and $15^a$; both pistons being similarly constructed.

Stem 10 extends through both pistons 14 and 15, being provided at its inner end with the nut 16, and at an intermediate point, and against piston 15, with the annular shoulder or flange 17 so as to control the double piston valve 13.

The outer shell or casing 4 is provided with orifices or ports 18 and 19 at opposite ends thereof, which may be designated as the exhaust ports; these orifices being either open to the atmosphere, or adapted to receive suitable pipe connections as clearly shown in the drawing. At a point intermediate of the ends, preferably substantially at the vertical center of the device, as shown in Fig. 1, the casing 4 is provided with an orifice or port 20, which is also adapted to receive suitable pipe connection leading from a supply of suitable driving medium or fluid. At a suitable point intermediate of orifices 18 and 20, and at a suitable point intermediate of orifices 19 and 20, and extended through the side wall of the shell or casing 4, I provide the orifices or ports 21 and 22, respectively shown in dotted lines in Fig. 1; orifice 22 being more clearly shown in Figs. 2 and 3.

The inner casing 7 is provided with a number of series of ports at predetermined points on its periphery; for example, the ports 23 are placed at one end of shell 7, so as to provide communication between the interior of shell 7 and the compartment 24 formed in casing 4 by one of the circumferential ribs 5 and inner shell 7; ports 25 in shell 7 are so placed as to afford communication between the interior of shell 7 and the compartment 26 formed by circumferential ribs 5 and shell 7; ports 27 being formed in the periphery of shell 7 so as to afford communication between the interior of shell 7 and the compartment 28 formed in the manner previously described and into which compartment orifice or port 20 enters; ports 29 formed in shell 7, afford communication between the interior of the shell and the compartment 30 formed by the circumferential ribs 5 and the cylindrical concentric shell 7; while the ports 31 extend through the periphery of shell 7 and afford communication with compartment 32, formed in a manner previously described, into which compartment the orifice 19, in casing 4, enters. The orifice or port 21, in casing 4, connects with compartment 26, and the port or orifice 22, in casing 4, leads to compartment 30.

Valve stem 10 is pivotally secured to the lever 33 through the medium of yoke 37, and the lever is pivoted at the end of the compensating fulcrum link 34 which latter is secured to the casing 4; the link 34 being preferably shown bifurcated, see Fig. 2, so as to extend about the lug 35 formed on the shell or casing 4.

In the operation of my improved valve, the operating fluid, from a suitable source of supply, is admitted through the connection or orifice 20 into compartment 28, passing through ports 27 into the chamber 36 within shell 7 formed by the two separated pistons 14 and 15. With the pistons 14 and 15 in the position shown in Fig. 1, it is evident that further passage of the fluid will be prevented and that it will be confined in chamber 36 until the pistons 14 and 15 are moved in shell 7. By pushing lever 33 to the right until piston 14 has passed beyond the orifices 25, the operating fluid within chamber 36 will be allowed to pass from chamber 36 through ports 25, into chamber 26, and out through orifice 21, into a suitable connection whereby the operating fluid is conveyed to the operating end of the cylinder to be actuated. With the valve in this position, it will be understood that the orifice or cylinder connection 22, at the opposite end of the device, will be in exhaust condition by reason of the movement of piston 15 with piston 14 toward the right of the device, as previously described. Moving lever 33 to the left, until piston 15 passes over ports 29, will permit the operating fluid or medium to pass from compartment 28 through ports 27 and into chamber 36, thence through ports 29 into chamber 30 and out through orifice 22 and a suitable connection to the operating end of another cylinder or to the opposite end of the same cylinder, as desired. This movement of the double piston at the same time produces an exhaust condition at the right hand end of the valve from the operating cylinder connected with orifice 21, which enters chamber 26, thus permitting the exhaust to be made from chamber 26, through ports 25, into the right hand end of shell 7, thence out through ports 23, into compartment 24 and out into the atmosphere through exhaust orifice of port 18, or through a suitable connection or piping connected with said port. It is thus apparent that when one end of the valve is admitting operating fluid to the connection leading to an operating cylinder, the other end of the valve is exhausting it from the opposite side of the same or another operating cylinder.

With the valve in the position shown in Fig. 1, the operating ends of the double acting cylinder or the operating ends of two single acting cylinders will be in exhaust condition; that is, at the right hand end, the cylinder connected therewith is open to exhaust into the atmosphere because the operating fluid or medium in the cylinder can escape through the cylinder-connection or orifice 21, into compartment 26, through ports 25 into the right hand end of cylindrical valve shell or chamber 7, out through ports 23, into compartment 24, and out through the orifice, and its connection, 18. At the same time, the cylinder-connection or orifice 22 will be open to permit the fluid or medium to exhaust into compartment 30, through ports 29, into the left hand end of the cylindrical valve shell or chamber 7, thence through ports 31, into compartment 32, and out through the exhaust orifice, and its connection, 19. It will be seen, therefore, that my improved valve can be put into inoperative position with both exhaust ports open so that the cylinder or cylinders controlled by the valve can drain and any leakage through the valve due to wear will pass out either exhaust without causing the piston or pistons, of the cylinder or cylinders, operated by the medium controlled by the valve, to "creep", as is common, however, in the many types of valves at present in use.

It is also evident from my improved construction that the same will be operative in any position that it is desired to arrange the valve.

The exhaust-orifices 18 and 19 may be open to the atmosphere or connected to a drain by any suitable pipe arrangement, which may screw into or otherwise be secured in the orifices, as clearly shown in Fig. 1.

I have shown and described the double piston valve 13 operated by the lever 33, which is shown connected to stem 10 by the yoke 37, but it is apparent that the stem and lever may not only be otherwise connected together, but the means for operating the double piston may be of any suitable type; and furthermore, other alterations may be made in certain details, as practice may dictate, without, however, departing from the spirit of my invention, and I do not wish to be understood, therefore, as limiting myself to the precise construction shown and described, but

What I claim as my invention, and wish to secure by Letters Patent, is:—

1. A valve of the class described, comprising an outer casing having an exhaust opening at each end thereof, a cylinder connecting orifice at each end of the casing intermediate of the exhaust ports and the center of the casing and an admission orifice substantially at the center thereof, said casing being provided with circumferential ribs on its inner circumference arranged at predetermined distances apart and on opposite sides of the openings or ports in said casing, a cylindrical valve-shell extending through said casing and fitting snugly against said ribs, said shell being provided with several series of ports arranged at points intermediate of the adjacently located ribs, means whereby the ends of the casing are closed, said means extending into the outer casing and into close proximity to the valve-shell so as to prevent escape of the medium or fluid and any appreciable longitudinal movement of the valve-shell, and a double piston-valve slidably mounted within said shell and of a predetermined length so that an exhaust condition through both exhaust-ports may be simultaneously had.

2. A device of the class described, comprising a set of spaced concentrically arranged cylindrical members provided with ports at predetermined points in their peripheries, the ports in the inner member coinciding with the ports in the outer member, means whereby the ends of said members are closed, means whereby the space intermediate of said members is divided into circumferential chambers coinciding with the correlated ports of the two members so that communication between adjacent chambers is had through the inner member, the ports at opposite ends of the outer member constituting exhaust ports, the port at each end of the outer member located adjacent to the exhaust port constituting a combined inlet and outlet port, while the port of the outer member intermediate of the combined inlet and outlet ports constitutes a supply port, a double piston-valve slidably mounted within the inner member and formed so as to provide a chamber intermediate of its ends, said chamber being of a length sufficient to permit communication between the ports substantially at the center of the inner member and either of the adjacent ports, whereby positioning of the valve substantially at the center of the device will establish an exhaust condition between the adjacent ports at both ends of the device, while movement of the valve toward either end of the device will establish an admission condition between the ports substantially at the center thereof and the adjacent ports at the ends of the members to which the valve has been moved, while said position of the valve will establish an exhaust condition at the opposite end of the device, and a lever pivotally mounted to one of said members and operatively connected to said valve whereby the latter is controlled.

3. A device of the class described, comprising a set of spaced concentrically arranged cylindrical members provided with coinciding ports at predetermined points in their peripheries, the end ports being adapted to act as exhaust ports, the ports adjacent to the exhaust ports constituting combined inlet and outlet ports, while the ports intermediate of the said combined inlet and outlet ports act as supply ports, the distance between the supply and adjacently placed combined inlet and outlet ports being greater than the distance between the combined outlet and inlet and exhaust ports at both ends of the members, the outer member being provided with circumferential ribs on its inner circumference arranged on opposite sides of the ports in said member so that communication between the adjacently placed ports must be had through the inner member, means adapted to extend into the ends of the outer member whereby the ends are closed, and a double piston-valve slidably mounted within the inner member and of a length coextensive with the distance between either set of combined inlet and outlet ports and the farthest removed wall of the supply port, thereby permitting communication between the supply and one set of combined inlet and outlet ports while in one position and communication between the combined inlet and outlet and exhaust ports at both ends of the device, when said valve is moved to a second or intermediate position.

HENRY W. JACOBS.

Witnesses:
FRANK MITCHELL,
DAVID H. OWEN.